(12) United States Patent
Iwakiri (10) Patent No.: US 6,476,407 B1
(45) Date of Patent: Nov. 5, 2002

(54) METHOD AND APPARATUS FOR RECORDING AND READING OUT RADIATION IMAGES

(75) Inventor: Naoto Iwakiri, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 70 days.

(21) Appl. No.: 09/664,066

(22) Filed: Sep. 18, 2000

(30) Foreign Application Priority Data

Sep. 17, 1999 (JP) .......................................... 11-263159

(51) Int. Cl.$^7$ .............................................. G03B 42/02
(52) U.S. Cl. ....................................... 250/589; 250/588
(58) Field of Search ................................ 250/589, 584, 250/585, 586, 588, 484.4

(56) References Cited

U.S. PATENT DOCUMENTS

| | | | |
|---|---|---|---|
| 4,394,581 A | 7/1983 | Takahashi et al. | 250/484.1 |
| 4,543,479 A | 9/1985 | Kato | 250/327.2 |
| 4,604,525 A | 8/1986 | Kitada et al. | 250/363 R |
| 4,851,679 A | 7/1989 | Tamura et al. | 250/327.2 |
| 4,883,961 A * | 11/1989 | Arakawa et al. | 250/588 |
| 5,877,508 A * | 3/1999 | Arakawa et al. | 250/588 |
| 6,326,636 B1 * | 12/2001 | Isoda et al. | 250/586 |

FOREIGN PATENT DOCUMENTS

| | | | |
|---|---|---|---|
| JP | 61-17999 | 1/1986 | ............ G21K/4/00 |
| JP | 62-36599 | 2/1987 | ............ G21K/4/00 |
| JP | 62-36600 | 2/1987 | ............ G21K/4/00 |
| JP | 62115148 A | 5/1987 | |
| JP | 3-238441 | 10/1991 | ........... G03B/42/02 |
| JP | 10-123635 | 5/1998 | ........... G03B/42/02 |

* cited by examiner

*Primary Examiner*—Georgia Epps
*Assistant Examiner*—Richard Hanig
(74) *Attorney, Agent, or Firm*—Sughrue Mion, PLLC (57) ABSTRACT

A stimulable phosphor sheet, on which a radiation image has been stored, is exposed to stimulating rays, which cause the stimulable phosphor sheet to emit light in proportion to the amount of energy stored thereon during its exposure to radiation. The stimulating rays are irradiated to a surface of the stimulable phosphor sheet, which surface is opposite to a radiation irradiation side surface of the stimulable phosphor sheet. The light, which is emitted from the two surfaces of the stimulable phosphor sheet, is photoelectrically detected to read out the radiation image. Residual energy, which remains on the stimulable phosphor sheet after the radiation image has been read out therefrom, is released. An image read-out section, in which the step of reading out the radiation image is performed, and an erasing section, in which the step of releasing the residual energy is performed, are reciprocally moved together with each other with respect to the stimulable phosphor sheet.

28 Claims, 4 Drawing Sheets

METHOD AND APPARATUS FOR RECORDING AND READING OUT RADIATION IMAGES

BACKGROUND OF THE INVENTION

1. Field of the Invention

This invention relates to a method and apparatus for reading out a radiation image from a stimulable phosphor sheet, on which the radiation image has been stored, to obtain an image signal representing the radiation image.

2. Description of the Related Art

It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause the stimulable phosphor sheet to emit light in proportion to the amount of energy stored thereon during its exposure to the radiation. The light emitted by the stimulable phosphor sheet, upon stimulation thereof, is guided by a light guide member and photoelectrically detected with photoelectric read-out means, such as a photomultiplier (hereinbelow referred to as the PMT), and converted into an electric image signal. The image signal is then processed and used for the reproduction of the radiation image of the object as a visible image on a recording material.

The applicant proposed built-in types of radiation image recording and read-out apparatuses, comprising: (i) circulation and conveyance means for conveying at least one stimulable phosphor sheet along a circulation path, (ii) an image recording section, which is located in the circulation path and in which a radiation image of an object is stored on the stimulable phosphor sheet, (iii) an image read-out section, which is located in the circulation path and in which the radiation image is read out from the stimulable phosphor sheet, and (iv) an erasing section, which is located in the circulation path and in which energy remaining on the stimulable phosphor sheet after the radiation image has been read out therefrom is released. The built-in types of radiation image recording and read-out apparatuses are disclosed in, for example, U.S. Patent Nos. 4,543,479 and 4,851,679, and Japanese Unexamined Patent Publication No. 3(1991)-238441. With the proposed built-in types of radiation image recording and read-out apparatuses, the stimulable phosphor sheet is utilized repeatedly and is processed efficiently.

Also, a different example of the built-in type of radiation image recording and read-out apparatus is proposed in, for example, Japanese Patent Publication No. 6(1994)-5358. In the proposed built-in type of radiation image recording and read-out apparatus, a stimulable phosphor sheet is kept stationary, and a read-out and erasing unit, which comprises an image read-out section and an erasing section combined into an integral body, is reciprocally moved with respect to the stimulable phosphor sheet. Also, a radiation image read-out operation is performed in the course of forward movement of the readout and erasing unit, and an erasing operation for releasing energy remaining on the stimulable phosphor sheet is performed in the course of backward movement of the read-out and erasing unit. In the proposed radiation image recording and read-out apparatus, the stimulating rays are irradiated to the surface of the stimulable phosphor sheet, which surface is opposite to the radiation irradiation side surface of the stimulable phosphor sheet, the light, which is emitted from the opposite surface of the stimulable phosphor sheet when the stimulable phosphor sheet is exposed to the stimulating rays, is detected photoelectrically, and the radiation image is thereby read out from the stimulable phosphor sheet.

However, with the radiation image recording and read-out apparatus proposed in Japanese Patent Publication No. 6(1994)-5358, wherein the stimulating rays are irradiated to the surface of the stimulable phosphor sheet, which surface is opposite to the radiation irradiation side surface of the stimulable phosphor sheet, the intensity of the light, which is emitted by the stimulable phosphor sheet when the stimulable phosphor sheet is exposed to the stimulating rays, is low. Therefore, the problems occur in that an image signal having a high signal-to-noise ratio cannot be obtained.

SUMMARY OF THE INVENTION

The primary object of the present invention is to provide a radiation image recording and read-out method, wherein stimulating rays are irradiated to a surface of a stimulable phosphor sheet, which surface is opposite to a radiation irradiation side surface of the stimulable phosphor sheet, and wherein an image signal having a high signal-to-noise ratio is capable of being obtained.

Another object of the present invention is to provide an apparatus for carrying out the radiation image recording and read-out method.

The present invention provides a radiation image recording and read-out method, comprising the steps of:

i) exposing a stimulable phosphor sheet, which is capable of storing a radiation image thereon, to radiation, which carries image information of an object, in order to store a radiation image of the object on the stimulable phosphor sheet, ii) exposing the stimulable phosphor sheet, on which the radiation image has been stored, to stimulating rays, which cause the stimulable phosphor sheet to emit light in proportion to the amount of energy stored thereon during its exposure to the radiation, the stimulating rays being irradiated to a surface of the stimulable phosphor sheet, which surface is opposite to a radiation irradiation side surface of the stimulable phosphor sheet, and photoelectrically detecting the light, which is emitted from the two surfaces of the stimulable phosphor sheet, with photoelectric read-out means in order to read out the radiation image and to obtain image signals representing the radiation image, iii) releasing residual energy, which remains on the stimulable phosphor sheet after the radiation image has been read out therefrom, and iv) reciprocally moving an image read-out section, in which the step of reading out the radiation image is performed, and an erasing section, in which the step of releasing the residual energy remaining on the stimulable phosphor sheet is performed, together with each other with respect to the stimulable phosphor sheet.

In the radiation image recording and read-out method in accordance with the present invention, in the step of reciprocally moving the image read-out section and the erasing section together with each other with respect to the stimulable phosphor sheet, the image read-out section and the erasing section may be moved together with each other while the stimulable phosphor sheet is being kept stationary. Alternatively, the stimulable phosphor sheet may be moved while the image read-out section and the erasing section are being kept stationary. As another alternative, both the stimulable phosphor sheet and the image read-out section, the erasing section may be moved.

The radiation image recording and read-out method in accordance with the present invention should preferably be modified such that the radiation image readout from the two surfaces of the stimulable phosphor sheet is performed in the course of forward movement in the reciprocal movement, and the releasing of the residual energy is performed in the course of backward movement in the reciprocal movement.

Alternatively, the radiation image recording and read-out method in accordance with the present invention should may be modified such that the radiation image readout from the two surfaces of the stimulable phosphor sheet is performed in the course of forward movement in the reciprocal movement, and the releasing of the residual energy is performed in the course of the forward movement in the reciprocal movement. In such cases, the releasing of the residual energy should preferably be further performed in the course of backward movement in the reciprocal movement.

Also, the radiation image recording and read-out method in accordance with the present invention should preferably be modified such that, when the storing of the radiation image on the stimulable phosphor sheet is to be performed, photoelectric read-out means, which is located at the radiation irradiation side surface of the stimulable phosphor sheet, is retreated from the radiation irradiation side surface of the stimulable phosphor sheet.

For such purposes, the photoelectric read-out means, which is located at the radiation irradiation side surface of the stimulable phosphor sheet, may be moved while the stimulable phosphor sheet is being kept stationary. Alternatively, the stimulable phosphor sheet may be moved while the photoelectric read-out means, which is located at the radiation irradiation side surface of the stimulable phosphor sheet, is being kept stationary. As another alternative, both the stimulable phosphor sheet and the photoelectric read-out means, which is located at the radiation irradiation side surface of the stimulable phosphor sheet, may be moved.

Further, in the radiation image recording and read-out method in accordance with the present invention, photoelectric read-out means, which is located at the radiation irradiation side surface of the stimulable phosphor sheet, should preferably be a long photomultiplier, means provided with a light guide member having flexibility (constituted of an optical fiber, or the like), or a semiconductor sensor.

Furthermore, in the radiation image recording and read-out method in accordance with the present invention, the stimulable phosphor sheet should preferably have anisotropy in a thickness direction of the stimulable phosphor sheet.

Also, in the radiation image recording and read-out method in accordance with the present invention, the stimulable phosphor sheet should preferably contain a coloring agent, which transmits only the light emitted by the stimulable phosphor sheet and absorbs the stimulating rays.

The present invention also provides an apparatus for carrying out the radiation image recording and read-out method in accordance with the present invention. Specifically, the present invention also provides a radiation image recording and read-out apparatus, comprising:

i) an image recording section for exposing a stimulable phosphor sheet, which is capable of storing a radiation image thereon, to radiation, which carries image information of an object, in order to store a radiation image of the object on the stimulable phosphor sheet, ii) an image read-out section provided with:
  a stimulating ray source for producing stimulating rays and irradiating the stimulating rays to the stimulable phosphor sheet, on which the radiation image has been stored, the stimulating rays being irradiated to a surface of the stimulable phosphor sheet, which surface is opposite to a radiation irradiation side surface of the stimulable phosphor sheet, the stimulating rays causing the stimulable phosphor sheet to emit light in proportion to the amount of energy stored thereon during its exposure to the radiation, and
  photoelectric read-out means for photoelectrically detecting the light, which is emitted from the two surfaces of the stimulable phosphor sheet, in order to read out the radiation image and to obtain image signals representing the radiation image, iii) an erasing section for releasing residual energy, which remains on the stimulable phosphor sheet after the radiation image has been read out therefrom in the image read-out section, and iv) movement means for reciprocally moving the image read-out section and the erasing section together with each other with respect to the stimulable phosphor sheet.

In the radiation image recording and read-out apparatus in accordance with the present invention, with the movement means, the image read-out section and the erasing section may be moved together with each other while the stimulable phosphor sheet is being kept stationary. Alternatively, with the movement means, the stimulable phosphor sheet may be moved while the image read-out section and the erasing section are being kept stationary. As another alternative, with the movement means, both the stimulable phosphor sheet and the image read-out section, the erasing section may be moved.

The radiation image recording and read-out apparatus in accordance with the present invention should preferably be modified such that the radiation image read-out from the two surfaces of the stimulable phosphor sheet is performed in the course of forward movement in the reciprocal movement, and the releasing of the residual energy by the erasing section is performed in the course of backward movement in the reciprocal movement.

Alternatively, the radiation image recording and read-out apparatus in accordance with the present invention should may be modified such that the radiation image readout from the two surfaces of the stimulable phosphor sheet is performed in the course of forward movement in the reciprocal movement, and the releasing of the residual energy by the erasing section is performed in the course of the forward movement in the reciprocal movement. In such cases, the releasing of the residual energy by the erasing section should preferably be further performed in the course of backward movement in the reciprocal movement.

Also, the radiation image recording and read-out apparatus in accordance with the present invention should preferably further comprise retreating means for operating such that, when the storing of the radiation image on the stimulable phosphor sheet is to be performed, the retreating means retreats photoelectric read-out means, which is located at the radiation irradiation side surface of the stimulable phosphor sheet, from the radiation irradiation side surface of the stimulable phosphor sheet.

With the retreating means, the photoelectric read-out means, which is located at the radiation irradiation side surface of the stimulable phosphor sheet, may be moved while the stimulable phosphor sheet is being kept stationary. Alternatively, with the retreating means, the stimulable phosphor sheet may be moved while the photoelectric read-out means, which is located at the radiation irradiation side surface of the stimulable phosphor sheet, is being kept stationary. As another alternative, with the retreating means, both the stimulable phosphor sheet and the photoelectric read-out means, which is located at the radiation irradiation side surface of the stimulable phosphor sheet, may be moved.

Further, in the radiation image recording and read-out apparatus in accordance with the present invention, photoelectric read-out means, which is located at the radiation irradiation side surface of the stimulable phosphor sheet, should preferably be a long photomultiplier, means provided with a light guide member having flexibility (constituted of an optical fiber, or the like), or a semiconductor sensor.

Furthermore, in the radiation image recording and read-out apparatus in accordance with the present invention, the stimulable phosphor sheet should preferably have anisotropy in a thickness direction of the stimulable phosphor sheet.

Also, in the radiation image recording and read-out apparatus in accordance with the present invention, the stimulable phosphor sheet should preferably contain a coloring agent, which transmits only the light emitted by the stimulable phosphor sheet and absorbs the stimulating rays.

With the radiation image recording and read-out method and the radiation image recording and read-out apparatus in accordance with the present invention, the stimulating rays are irradiated to the surface of the stimulable phosphor sheet, which surface is opposite to the radiation irradiation side surface of the stimulable phosphor sheet, and the light, which is emitted from each of the two surfaces of the stimulable phosphor sheet when the stimulable phosphor sheet is exposed to the stimulating rays, is photoelectrically detected. In this manner, the readout of the radiation image is performed. Therefore, the efficiency, with which the light emitted by the stimulable phosphor sheet is collected, is capable of being enhanced. The two image signals having been detected from the two surfaces of the stimulable phosphor sheet may then be added to each other, and an image signal having an enhanced signal-to-noise ratio can thereby be obtained.

With the radiation image recording and read-out method and the radiation image recording and read-out apparatus in accordance with the present invention, wherein the radiation image readout from the two surfaces of the stimulable phosphor sheet is performed in the course of the forward movement in the reciprocal movement of the image read-out section and the erasing section, and the releasing (i.e., the erasing) of the residual energy is performed in the course of backward movement in the reciprocal movement, the radiation image readout and the releasing of the residual energy are capable of being performed efficiently.

With the radiation image recording and read-out method and the radiation image recording and read-out apparatus in accordance with the present invention, wherein the radiation image readout and the releasing of the residual energy are performed simultaneously in the course of the forward movement in the reciprocal movement, the radiation image readout and the releasing of the residual energy can be performed with one time of movement. Therefore, the radiation image readout and the releasing of the residual energy can be performed more efficiently. In such cases, the releasing of the residual energy may further be performed in the course of the backward movement in the reciprocal movement. In this manner, even if the dose of radiation delivered to the stimulable phosphor sheet is large and therefore the residual energy cannot be released sufficiently in the course of the forward movement alone in the reciprocal movement, the residual energy remaining on the stimulable phosphor sheet is capable of being released reliably.

With the radiation image recording and read-out method and the radiation image recording and read-out apparatus in accordance with the present invention, when the storing of the radiation image on the stimulable phosphor sheet is to be performed, the photoelectric read-out means, which is located at the radiation irradiation side surface of the stimulable phosphor sheet, may be retreated from the radiation irradiation side surface of the stimulable phosphor sheet. In such cases, the problems do not occur in that the photoelectric read-out means, which is located at the radiation irradiation side surface of the stimulable phosphor sheet, is exposed to the radiation. Therefore, the photoelectric read-out means is capable of being prevented from becoming impoverished by the radiation.

With the radiation image recording and read-out method and the radiation image recording and read-out apparatus in accordance with the present invention, wherein the photoelectric read-out means, which is located at the radiation irradiation side surface of the stimulable phosphor sheet, is a long photomultiplier, means provided with a light guide member having flexibility, or a semiconductor sensor, the space required to locate the photoelectric read-out means at the radiation irradiation side surface of the stimulable phosphor sheet is capable of being kept small. Therefore, the size of the radiation image recording and read-out apparatus can be kept small.

With the radiation image recording and read-out method and the radiation image recording and read-out apparatus in accordance with the present invention, wherein the stimulable phosphor sheet has anisotropy in the thickness direction of the stimulable phosphor sheet, scattering of the stimulating rays within the stimulable phosphor sheet can be prevented, and an image signal representing an image of a high resolution can thereby obtained.

With the radiation image recording and read-out method and the radiation image recording and read-out apparatus in accordance with the present invention, wherein the stimulable phosphor sheet contains the coloring agent, which transmits only the light emitted by the stimulable phosphor sheet and absorbs the stimulating rays, scattering of the stimulating rays within the stimulable phosphor sheet can be prevented, and an image signal representing an image of a high resolution can thereby be obtained.

DESCRIPTION OF THE PREFERRED EMBODIMENTS

The present invention will hereinbelow be described in further detail with reference to the accompanying drawings.

Figure 1:
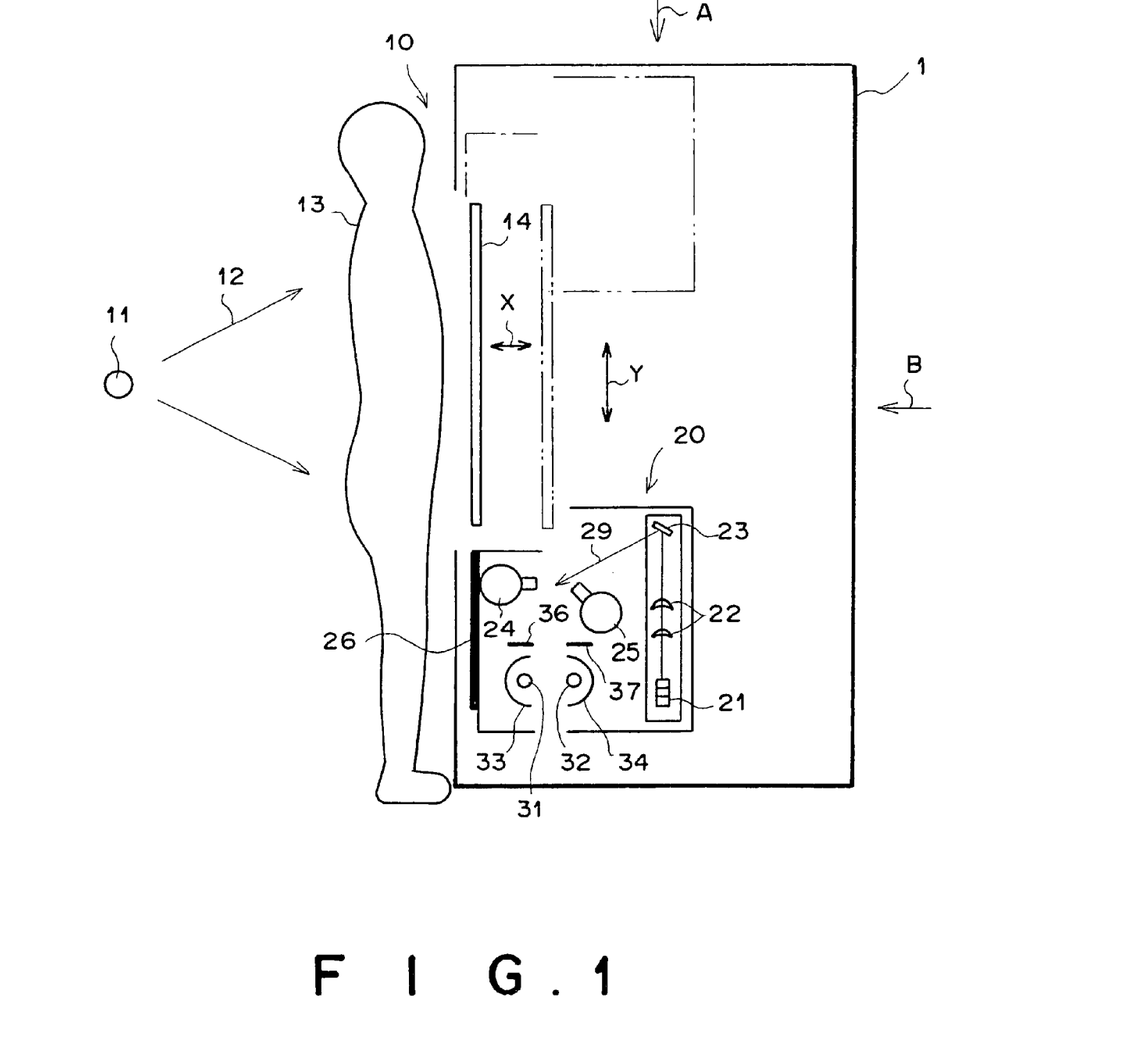
FIG. 1 is a schematic view showing an embodiment of the radiation image recording and read-out apparatus in accordance with the present invention.

FIG. 1 is a schematic view showing an embodiment of the radiation image recording and read-out apparatus in accordance with the present invention. As illustrated in FIG. 1, a radiation image recording and read-out apparatus 1 comprises an image recording section 10 and a read-out and erasing unit 20. In the image recording section 10, radiation 12 is produced by a radiation source 11 and is irradiated to an object 13, and the radiation 12 carrying image information of the object 13 is irradiated to a stimulable phosphor sheet 14. In this manner, a radiation image of the object 13 is stored on the stimulable phosphor sheet 14. The stimulable phosphor sheet 14 comprises a substrate having rigidity, which may be formed from glass, an acrylic resin, or the like, and a stimulable phosphor layer overlaid on the substrate. The stimulable phosphor sheet 14 is capable of being moved by a driving mechanism reciprocally in the directions indicated by the double headed arrow X and between the position indicated by the solid lines in FIG. 1 and the position indicated by the double-dot chained lines in FIG. 1.

Figure 2:
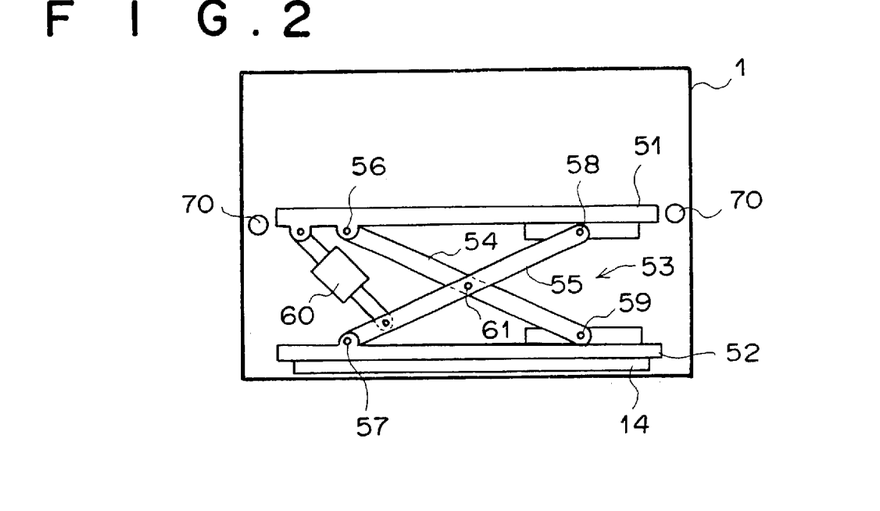
FIG. 2 is a schematic view showing a driving mechanism for a stimulable phosphor sheet, the view being taken from the direction indicated by the arrow A in FIG. 1.

FIG. 2 is a schematic view showing the driving mechanism for the stimulable phosphor sheet 14, the view being taken from the direction indicated by the arrow A in FIG. 1. As illustrated in FIG. 2, the driving mechanism comprises a secured base 51, a movable base 52 for supporting the stimulable phosphor sheet 14, and X link mechanisms 53, 53. The X link mechanisms 53, 53 are located between the secured base 51 and the movable base 52 and at positions above and below the stimulable phosphor sheet 14 in FIG. 1. In each of the X link mechanisms 53, 53, members 54 and 55 are connected with each other at a supporting point 61. One end of the member 54 is connected to a supporting point 56 of the secured base 51, and the other end of the member 54 is connected to a movable supporting point 59 of the movable base 52. Also, one end of the member 55 is connected to a movable supporting point 58 of the secured base 51, and the other end of the member 55 is connected to a supporting point 57 of the movable base 52. Further, a driving member 60 is connected to the member 55 and the secured base 51. The driving member 60 is constituted of a hydraulic cylinder. When the driving member 60 is extended, the movable base 52 is moved to move the stimulable phosphor sheet 14 to the position for the image recording. which is indicated by the solid lines in FIG. 1. When the driving member 60 is contracted, the movable base 52 is moved to move the stimulable phosphor sheet 14 to the position for the image readout, which position will be described below and is shown in FIG. 1. In FIG. 2, ball screws 70, 70, which constitute a vertical movement mechanism for vertically moving the read-out and erasing unit 20 as will be described later, are also shown. The driving mechanism for the stimulable phosphor sheet 14 is located such that the driving mechanism does not interfere with the ball screws 70, 70.

The stimulable phosphor sheet 14 should preferably have anisotropy in the thickness direction of the stimulable phosphor sheet 14 as described in, for example, Japanese Unexamined Patent Publication Nos. 62(1987)-36599 and 62(1987)-36600. In cases where the stimulable phosphor sheet 14 has the anisotropy in the thickness direction of the stimulable phosphor sheet 14, at the time of the radiation image readout, which will be described later, the stimulating rays can be prevented from scattering within the stimulable phosphor sheet 14, and an image signal representing an image of high sharpness can thereby be obtained. Also, the stimulable phosphor sheet 14 should preferably contain a coloring agent, which transmits only the light emitted by the stimulable phosphor sheet 14 and absorbs the stimulating rays, as described in, for example, Japanese Patent Publication No. 59(1984)-23400 and Japanese Unexamined Patent Publication No. 61(1986)-17999. In such cases, the stimulating rays can be prevented from diffusing within the stimulable phosphor sheet 14, and an image signal representing an image of high sharpness can thereby be obtained. In the explanation of this embodiment, the radiation irradiation side surface of the stimulable phosphor sheet 14, which surface is located on the side of irradiation of the radiation 12, is referred to as the front surface, and the surface of the stimulable phosphor sheet 14 opposite to the radiation irradiation side surface is referred to as the back surface.

Figure 3:
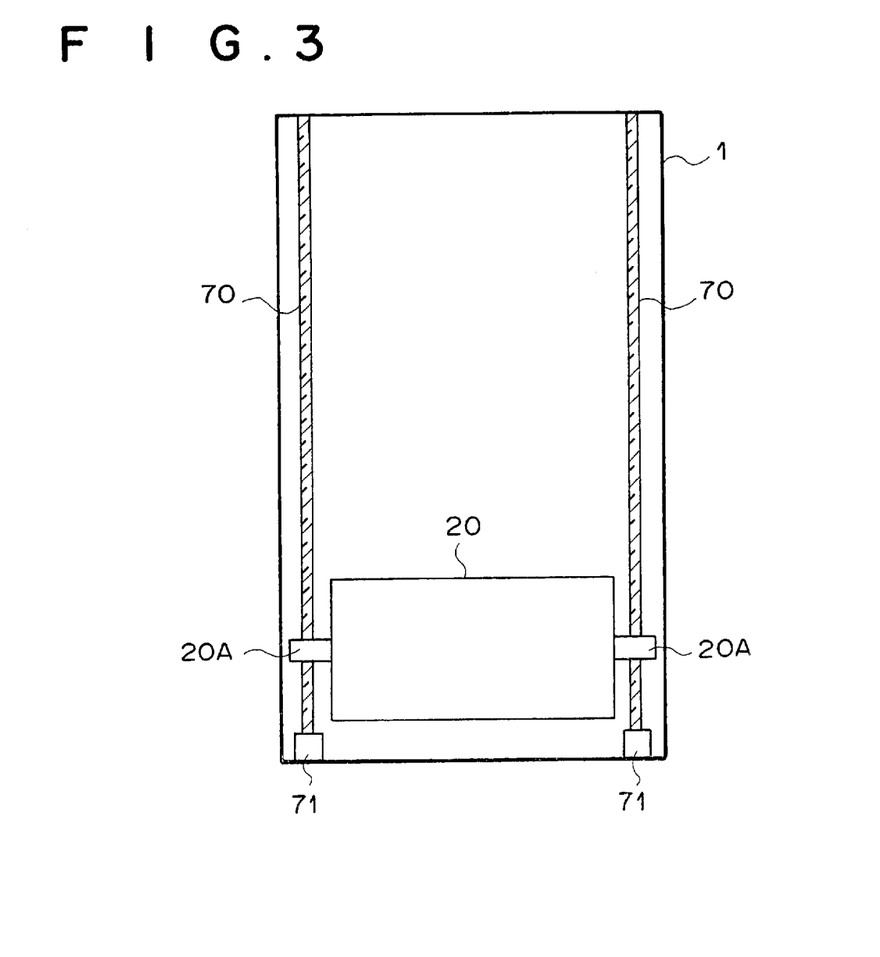
FIG. 3 is a schematic view showing a vertical movement mechanism for vertically moving a read-out and erasing unit, the view being taken from the direction indicated by the arrow B in FIG. 1.
Figure 4:
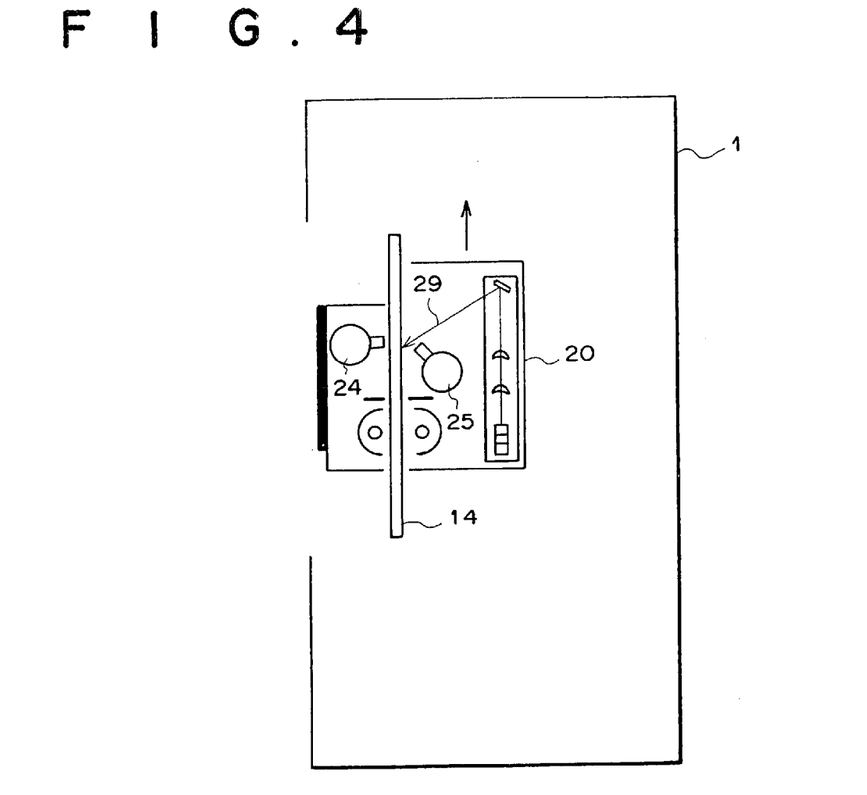
FIG. 4 is a schematic view showing a state, in which a radiation image is read out.

FIG. 3 is a schematic view showing the vertical movement mechanism for vertically moving the read-out and erasing unit 20, the view being taken from the direction indicated by the arrow B in FIG. 1. As illustrated in FIG. 3, the vertical movement mechanism comprises the two ball screws 70, 70, which are inserted respectively through right and left support members 20A, 20A of the read-out and erasing unit 20. The vertical movement mechanism also comprises motors 71, 71 for synchronously rotating the ball screws 70, 70. When the motors 71, 71 are rotated, the read-out and erasing unit 20 is moved upwardly or downwardly in accordance with the direction of rotation of the motors 71, 71. With the vertical movement mechanism, the read-out and erasing unit 20 is capable of being moved reciprocally in the directions, which are indicated by the double headed arrow Y in FIG. 1, and between the position indicated by the solid lines in FIG. 1 and the position indicated by the double-dot chained lines in FIG. 1. As illustrated in FIG. 1, when the radiation image is to be stored on the stimulable phosphor sheet 14, the read-out and erasing unit 20 is moved to the position below the stimulable phosphor sheet 14. When the radiation image is to be read out from the stimulable phosphor sheet 14, on which the radiation image has been stored, the stimulable phosphor sheet 14 is moved to the position indicated by the double-dot chained lines in FIG. 1. Also, the read-out and erasing unit 20 is moved by the vertical movement mechanism upwardly from the position indicated in FIG. 1, and the radiation image readout is performed as illustrated in FIG. 4.

In the read-out and erasing unit 20, a laser beam 29 is produced by a laser beam source (not shown), which acts as a stimulating ray source. The laser beam 29 is reflected and deflected by deflection means 21, which may be constituted of a rotating polygon mirror, or the like. The laser beam 29 then passes through converging lenses 22, 22, which may be constituted of fθ lenses, or the like. The laser beam 29 is then reflected by a reflecting mirror 23 and impinges upon the back surface of the stimulable phosphor sheet 14. The stimulable phosphor sheet 14 is thus scanned with the laser beam 29 in the main scanning direction, which is approximately normal to the sub-scanning direction (i.e., the vertical direction in FIG. 1), i.e., in the direction normal to the plane of the sheet of FIG. 1. When the stimulable phosphor sheet 14 is exposed to the laser beam 29, the exposed portion of the stimulable phosphor sheet 14 emits light in proportion to the amount of energy stored thereon during its exposure to the radiation 12. The light, which is emitted from the front surface of the stimulable phosphor sheet 14, is photoelectrically detected by a long PMT 24, which extends in the direction normal to the plane of the sheet of FIG. 1. Also, the light, which is emitted from the back surface of the stimulable phosphor sheet 14, is photoelectrically detected by a long PMT 25, which extends in the direction normal to the plane of the sheet of FIG. 1. In this manner, image signals representing the radiation image are obtained. Each of the image signals is logarithmically amplified by a logarithmic amplifier (not shown) and is then converted by an analog-to-digital converter (not shown) into a digital image signal. The thus obtained two digital image signals are added to each other. An image signal obtained from the addition is subjected to predetermined image processing, and the thus obtained processed image signal is used for reproducing a visible image.

A lead plate 26 is located on the rear side of the long PMT 24. With the lead plate 26, the radiation 12 can be prevented from impinging upon the long PMT 24 when the radiation image is recorded on the stimulable phosphor sheet 14. The lead plate 26 may be mounted on the read-out and erasing unit 20 as illustrated in FIG. 1. Alternatively, the lead plate 26 may be located at a position on the case housing of the radiation image recording and read-out apparatus 1, the position corresponding to the position at which the long PMT 24 is located at the time of the image recording.

Also, in the read-out and erasing unit 20, an erasing light source 31, which may be constituted of fluorescent lamps, tungsten lamps, or the like, is located at the position corresponding to the front surface side of the stimulable phosphor sheet 14. Also, an erasing light source 32, which may be constituted of fluorescent lamps, tungsten lamps, or the like, is located at the position corresponding to the back surface side of the stimulable phosphor sheet 14. Further, the erasing light sources 31 and 32 are respectively provided with reflecting hoods 33 and 34, which act such that the erasing light may be efficiently irradiated to the stimulable phosphor sheet 14. The erasing light sources 31 and 32 are also respectively provided with light blocking plates 36 and 37, which prevent the erasing light from impinging upon the long PMT 24 and the long PMT 25. After the radiation image readout from the stimulable phosphor sheet 14 has been finished, the read-out and erasing unit 20 has been moved to the position indicated by the double-dot chained lines in FIG. 1. Thereafter, the read-out and erasing unit 20 is moved downwardly. Therefore, in the course of the downward movement of the read-out and erasing unit 20, the erasing light sources 31 and 32 are turned on, and the erasing light is irradiated to the stimulable phosphor sheet 14. In this manner, residual energy remaining on the stimulable phosphor sheet 14 is released from the stimulable phosphor sheet 14. The erased stimulable phosphor sheet 14 is then moved to the position for the recording of a radiation image of the object 13, which position is indicated by the solid lines in FIG. 1.

As described above, in this embodiment, the laser beam 29 is irradiated to the back surface of the stimulable phosphor sheet 14. When the stimulable phosphor sheet 14 is thus exposed to the laser beam 29, the light is emitted from the two surfaces of the stimulable phosphor sheet 14. The light, which is emitted from the front surface of the stimulable phosphor sheet 14, is photoelectrically detected by the long PMT 24. Also, the light, which is emitted from the back surface of the stimulable phosphor sheet 14, is photoelectrically detected by the long PMT 25. In this manner, the radiation image is read out from the stimulable phosphor sheet 14. Therefore, the efficiency, with which the emitted light is collected, can be enhanced. Also, by the addition of the two image signals having been obtained from the two surfaces of the stimulable phosphor sheet 14, an image signal having an enhanced signal-to-noise ratio can be obtained.

Also, when the radiation image is to be recorded on the stimulable phosphor sheet 14, the long PMT 24, which is located on the front surface side of the stimulable phosphor sheet 14, is retreated from the front surface of the stimulable phosphor sheet 14. Therefore, the operation for recording the radiation image on the stimulable phosphor sheet 14 is not obstructed by the long PMT 24, and the radiation 12 can be prevented from impinging upon the long PMT 24 and impoverishing the long PMT 24. Further, since the lead plate 26 is located on the rear surface side of the long PMT 24, the radiation 12 can be reliably prevented from impinging upon the long PMT 24.

Furthermore, the photoelectric read-out means located on the front surface side of the stimulable phosphor sheet 14 is constituted of the long PMT 24. Therefore, the space required to located the photoelectric read-out means on the front surface side of the stimulable phosphor sheet 14 can be kept small, and the radiation image recording and read-out apparatus 1 can be kept small in size.

Figure 5:
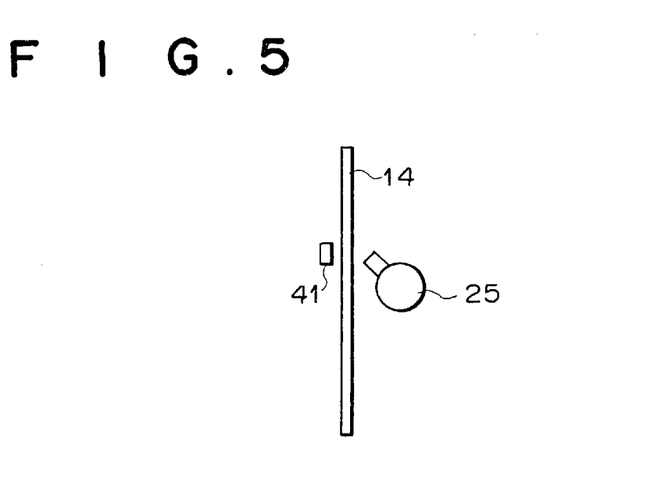
FIG. 5 is a schematic view showing a different example of a read-out and erasing unit.
Figure 6:
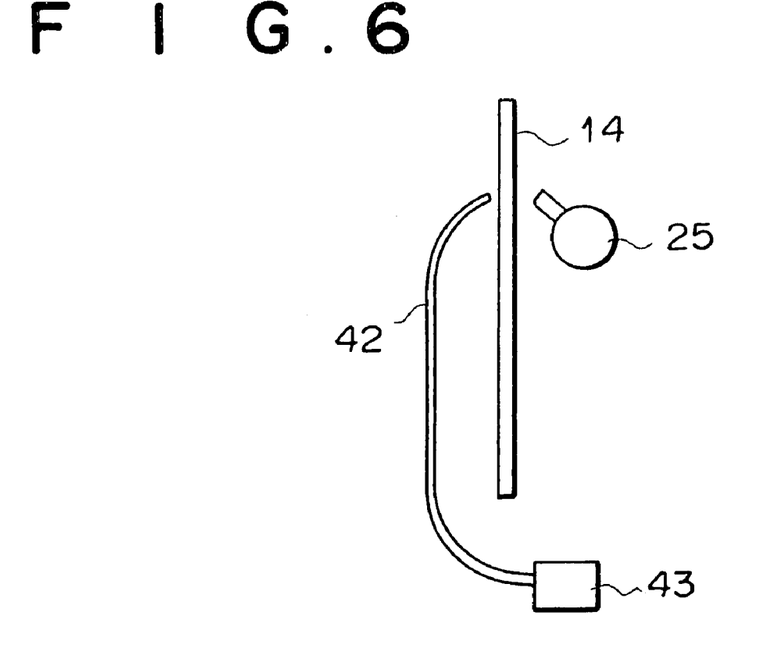
FIG. 6 is a schematic view showing a further different example of a read-out and erasing unit.

In the embodiment described above, the long PMT 24 is utilized as the photoelectric read-out means, which is located on the front surface side of the stimulable phosphor sheet 14. Alternatively, as illustrated in FIG. 5, a line sensor 41, which extends in the direction normal to the plane of the sheet of FIG. 5, may be utilized as the photoelectric read-out means, which is located on the front surface side of the stimulable phosphor sheet 14. As another alternative, as illustrated in FIG. 6, the photoelectric read-out means, which is located on the front surface side of the stimulable phosphor sheet 14, may be constituted of an optical fiber 42 having flexibility and a PMT 43. The optical fiber 42 has a light input end face, which extends in the direction normal to the plane of the sheet of FIG. 6. In FIG. 5 and FIG. 6, the deflection means 21, the converging lens 22, and the reflecting mirror 23 are not shown.

Figure 7:
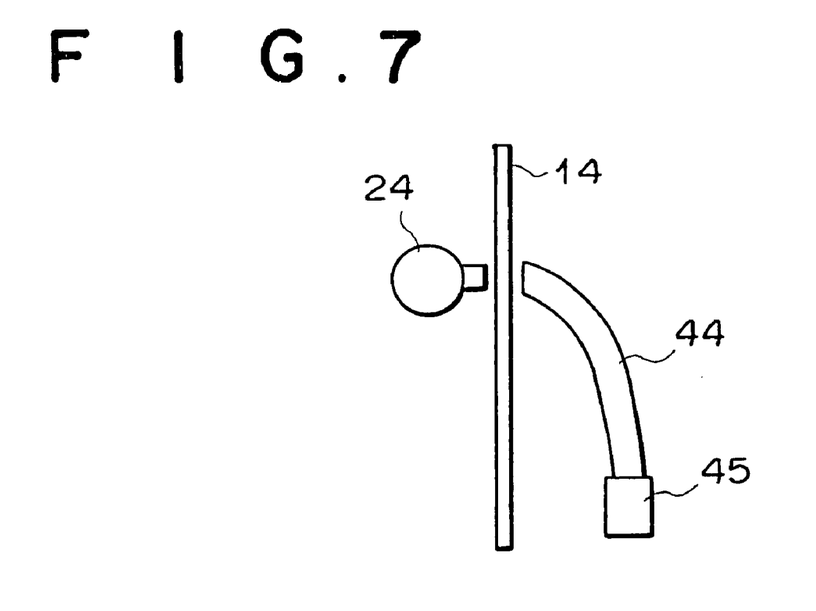
FIG. 7 is a schematic view showing a still further different example of a read-out and erasing unit.

Also, the photoelectric read-out means, which is located on the back surface side of the stimulable phosphor sheet 14, is not limited to the long PMT 25. For example, the photoelectric read-out means, which is located on the back surface side of the stimulable phosphor sheet 14, may be constituted of the line sensor 41 shown in FIG. 5, or the combination of the optical fiber 42 and the PMT 43 shown in FIG. 6. As a further alternative, as illustrated in FIG. 7, the photoelectric read-out means, which is located on the back surface side of the stimulable phosphor sheet 14, may be constituted of a combination of a light guide member 44, which may be formed from an acrylic resin, and a PMT 45. In such cases, the photoelectric read-out means, which is located on the front surface side of the stimulable phosphor sheet 14, is not limited to the long PMT 24 and may be constituted of the line sensor 41 shown in FIG. 5, or the combination of the optical fiber 42 and the PMT 43 shown in FIG. 6.

Further, in the embodiment described above, the stimulable phosphor sheet 14 is moved to the right in FIG. 1, and the radiation image readout and the erasing are then performed. Alternatively, the stimulable phosphor sheet 14 may be kept at the position for the image recording, the read-out and erasing unit 20 may be moved to the left in FIG. 1, and the radiation image readout and the erasing may then be performed. As another alternative, the stimulable phosphor sheet 14 may be moved to the right in FIG. 1, the read-out and erasing unit 20 may be moved to the left in FIG. 1, and the radiation image readout and the erasing may then be performed.

Furthermore, in the embodiment described above, the read-out and erasing unit 20 is moved vertically, and the radiation image readout and the erasing are thereby performed. Alternatively, the read-out and erasing unit 20 may be kept stationary, the stimulable phosphor sheet 14 may be moved vertically in FIG. 1, and the radiation image readout and the erasing may thereby be performed. As another alternative, both the stimulable phosphor sheet 14 and the read-out and erasing unit 20 may be moved in different directions, and the radiation image readout may thereby be performed.

Also, in the embodiment described above, the radiation image readout is performed in the course of the forward (in this case, upward) movement of the read-out and erasing unit 20, and the releasing (erasing) of the residual energy is performed in the course of the backward (in this case, downward) movement of the read-out and erasing unit 20. Alternatively, in the same manner as that in an apparatus described in, for example, Japanese Unexamined Patent Publication No. 10(1998)-123635, both the radiation image readout and the erasing may be performed simultaneously in the course of the forward movement of the read-out and erasing unit 20. In cases where the dose of radiation delivered to the stimulable phosphor sheet 14 is large and therefore the residual energy cannot be released sufficiently in the course of the forward movement alone of the read-out and erasing unit 20, the erasing-may further be performed in the course of the backward movement of the read-out and erasing unit 20.

In addition, all of the contents of Japanese Patent Application No. 11(1999)-263159 are incorporated into this specification by reference.

What is claimed is:

1. A radiation image recording and read-out method, comprising the steps of:

i) exposing a stimulable phosphor sheet, which is capable of storing a radiation image thereon, to radiation, which carries image information of an object, in order to store a radiation image of the object on the stimulable phosphor sheet, ii) exposing the stimulable phosphor sheet, on which the radiation image has been stored, to stimulating rays, which cause the stimulable phosphor sheet to emit light in proportion to the amount of energy stored thereon during its exposure to the radiation, the stimulating rays being irradiated to a surface of the stimulable phosphor sheet, which surface is opposite to a radiation irradiation side surface of the stimulable phosphor sheet, and photoelectrically detecting the light, which is emitted from the two surfaces of the stimulable phosphor sheet, with photoelectric read-out means in order to read out the radiation image and to obtain image signals representing the radiation image, iii) releasing residual energy, which remains on the stimulable phosphor sheet after the radiation image has been read out therefrom, and iv) reciprocally moving an image read-out section, in which the step of reading out the radiation image is performed, and an erasing section, in which the step of releasing the residual energy remaining on the stimulable phosphor sheet is performed, together with each other with respect to the stimulable phosphor sheet.

2. A method as defined in claim 1 wherein the radiation image readout from the two surfaces of the stimulable phosphor sheet is performed in the course of forward movement in the reciprocal movement, and the releasing of the residual energy is performed in the course of backward movement in the reciprocal movement.

3. A method as defined in claim 1 wherein the radiation image readout from the two surfaces of the stimulable phosphor sheet is performed in the course of forward movement in the reciprocal movement, and the releasing of the residual energy is performed in the course of the forward movement in the reciprocal movement.

4. A method as defined in claim 3 wherein the releasing of the residual energy is further performed in the course of backward movement in the reciprocal movement.

5. A method as defined in claim 1, 2, 3, or 4 wherein, when the storing of the radiation image on the stimulable phosphor sheet is to be performed, photoelectric read-out means, which is located at the radiation irradiation side surface of the stimulable phosphor sheet, is retreated from the radiation irradiation side surface of the stimulable phosphor sheet.

6. A method as defined in claim 1, 2, 3, or 4 wherein photoelectric read-out means, which is located at the radiation irradiation side surface of the stimulable phosphor sheet, is a long photomultiplier.

7. A method as defined in claim 1, 2, 3, or 4 wherein photoelectric read-out means, which is located at the radiation irradiation side surface of the stimulable phosphor sheet, is means provided with a light guide member having flexibility.

8. A method as defined in claim 1, 2, 3, or 4 wherein photoelectric read-out means, which is located at the radiation irradiation side surface of the stimulable phosphor sheet, is a semiconductor sensor.

9. A method as defined in claim 1, 2, 3, or 4 wherein the stimulable phosphor sheet has anisotropy in a thickness direction of the stimulable phosphor sheet.

10. A method as defined in claim 1, 2, 3, or 4 wherein the stimulable phosphor sheet contains a coloring agent, which transmits only the light emitted by the stimulable phosphor sheet and absorbs the stimulating rays.

11. A radiation image recording and read-out apparatus, comprising:

i) an image recording section for exposing a stimulable phosphor sheet, which is capable of storing a radiation image thereon, to radiation, which carries image information of an object, in order to store a radiation image of the object on the stimulable phosphor sheet, ii) an image read-out section provided with:

a stimulating ray source for producing stimulating rays and irradiating the stimulating rays to the stimulable phosphor sheet, on which the radiation image has been stored, the stimulating rays being irradiated to a surface of the stimulable phosphor sheet, which surface is opposite to a radiation irradiation side surface of the stimulable phosphor sheet, the stimulating rays causing the stimulable phosphor sheet to emit light in proportion to the amount of energy stored thereon during its exposure to the radiation, and photoelectric read-out means for photoelectrically detecting the light, which is emitted from the two surfaces of the stimulable phosphor sheet, in order to read out the radiation image and to obtain image signals representing the radiation image, iii) an erasing section for releasing residual energy, which remains on the stimulable phosphor sheet after the radiation image has been read out therefrom in the image read-out section, and iv) movement means for reciprocally moving the image read-out section and the erasing section together with each other with respect to the stimulable phosphor sheet.

12. An apparatus as defined in claim 11 wherein the radiation image readout from the two surfaces of the stimulable phosphor sheet is performed in the course of forward movement in the reciprocal movement, and the releasing of the residual energy by the erasing section is performed in the course of backward movement in the reciprocal movement.

13. An apparatus as defined in claim 11 wherein the radiation image readout from the two surfaces of the stimulable phosphor sheet is performed in the course of forward movement in the reciprocal movement, and the releasing of the residual energy by the erasing section is performed in the course of the forward movement in the reciprocal movement.

14. An apparatus as defined in claim 13 wherein the releasing of the residual energy by the erasing section is further performed in the course of backward movement in the reciprocal movement.

15. An apparatus as defined in claim 11, 12, 13, or 14 further comprising retreating means for operating such that, when the storing of the radiation image on the stimulable phosphor sheet is to be performed, the retreating means retreats photoelectric read-out means, which is located at the radiation irradiation side surface of the stimulable phosphor sheet, from the radiation irradiation side surface of the stimulable phosphor sheet.

16. An apparatus as defined in claim 11, 12, 13, or 14 wherein photoelectric read-out means, which is located at the radiation irradiation side surface of the stimulable phosphor sheet, is a long photomultiplier.

17. An apparatus as defined in claim 11, 12, 13, or 14 wherein photoelectric read-out means, which is located at the radiation irradiation side surface of the stimulable phosphor sheet, is means provided with a light guide member having flexibility.

18. An apparatus as defined in claim 11, 12, 13, or 14 wherein photoelectric read-out means, which is located at the radiation irradiation side surface of the stimulable phosphor sheet, is a semiconductor sensor.

19. An apparatus as defined in claim 11, 12, 13, or 14 wherein the stimulable phosphor sheet has anisotropy in a thickness direction of the stimulable phosphor sheet.

20. An apparatus as defined in claim 11, 12, 13, or 14 wherein the stimulable phosphor sheet contains a coloring agent, which transmits only the light emitted by the stimulable phosphor sheet and absorbs the stimulating rays.

21. A radiation image recording and read-out method, comprising the steps of:

i) exposing a stimulable phosphor sheet, which is capable of storing a radiation image thereon, to radiation, which carries image information of an object, in order to store a radiation image of the object on the stimulable phosphor sheet, ii) exposing the stimulable phosphor sheet, on which the radiation image has been stored to stimulating rays, which cause the stimulable phosphor sheet to emit light in proportion to the amount of energy stored thereon during its exposure to the radiation, the stimulating rays being irradiated to a surface of the stimulable phosphor sheet, which surface is opposite to a radiation irradiation side surface of the stimulable phosphor sheet, and photoelectrically detecting the light, which is emitted from the two surfaces of the stimulable phosphor sheet, with photoelectric read-out means in order to read out the radiation image and to obtain image signals representing the radiation image, iii) releasing residual energy, which remains on the stimulable phosphor sheet after the radiation image has been read out therefrom, and iv) reciprocally moving an image read-out section, in which the step of reading out the radiation image is performed, and an erasing section, in which the step of releasing the residual energy remaining on the stimulable phosphor sheet is performed, together with each other vertically and horizontally with respect to the stimulable phosphor sheet.

22. A radiation image recording and read-out apparatus, comprising:

i) an image recording section for exposing a stimulable phosphor sheet, which is capable of storing a radiation image thereon, to radiation, which carries image information of an object, in order to store a radiation image of the object on the stimulable phosphor sheet, ii) an image read-out section provided with:

a stimulating ray source for producing stimulating rays and irradiating the stimulating rays to the stimulable phosphor sheet, on which the radiation image has been stored, the stimulating rays being irradiated to a surface of the stimulable phosphor sheet, which surface is opposite to a radiation irradiation side surface of the stimulable phosphor sheet, the stimulating rays causing the stimulable phosphor sheet to emit light in proportion to the amount of energy stored thereon during its exposure to the radiation, and photoelectric read-out means for photoelectrically detecting the light, which is emitted from the two surfaces of the stimulable phosphor sheet, in order to read out the radiation image and to obtain image signals representing the radiation image, iii) an erasing section for releasing residual energy, which remains on the stimulable phosphor sheet after the radiation image has been read out therefrom in the image read-out section, and iv) movement means for reciprocally moving the image read-out section and the erasing section together with each other vertically and horizontally with respect to the stimulable phosphor sheet.

23. A method as defined in claim 21, wherein the horizontal movement moves the stimulable phosphor sheet from an image recording position to an image read-out position after the radiation image is stored on the stimulable phosphor sheet and moves the stimulable phosphor sheet to the image recording position from the image read-out position after the residual energy is released from the stimulable phosphor sheet.

24. A method as defined in claim 21, wherein the vertical movement is performed during the step of reading out of the radiation image and the step of releasing the residual energy.

25. An apparatus as defined in claim 22, wherein the horizontal movement moves the stimulable phosphor sheet from an image recording position to an image read-out position after the radiation image is stored on the stimulable phosphor sheet and moves the stimulable phosphor sheet to the image recording position from the image read-out position after the residual energy is released from the stimulable phosphor sheet.

26. An apparatus as defined in claim 22, wherein the vertical movement is performed during the reading out of the image and the releasing the residual energy.

27. A method according to claim 23, wherein the horizontal movement comprises moving the stimulable phosphor sheet in a direction orthogonally away from the object being imaged to perform image read out.

28. An apparatus according to claim 25, wherein the horizontal movement comprises moving the stimulable phosphor sheet in a direction orthogonally away from the object being imaged to perform image read out.

* * * * *